United States Patent Office 3,739,044
Patented June 12, 1973

3,739,044
LOW TEMPERATURE POLYMERIZATION PROCESS AND INITIATING SYSTEM
David K. Wald, Cherry Hill, N.J., assignor to E. I. du Pont de Nemours and Company, Wilmington, Del.
No Drawing. Continuation-in-part of application Ser. No. 867,904, Oct. 20, 1969. This application Dec. 9, 1971, Ser. No. 206,552
Int. Cl. C08f 15/26
U.S. Cl. 260—885                    3 Claims

ABSTRACT OF THE DISCLOSURE

A process for preparing a polymer by low temperature polymerization in an organic liquid, using as a polymerization initiator a system which comprises (1) a peroxy or peracid compound,
(2) benzoin, and
(3) a metal salt.

CROSS-REFERENCE TO RELATED APPLICATION

This application is a continuous-in-part of application Ser. No. 867,904 filed Oct. 20, 1969, now abandoned.

BACKGROUND OF THE INVENTION

When preparing synthetic organic polymers in the organic media, it is sometimes desirable to use as low a polymerization temperature as possible to avoid producing low molecular weight polymer fractions. Initiating systems now exist which function in organic media at such low temperatures. For example, metal alkyls, unstable peroxides and azo compounds, and trialkyl borons with oxygen can be used. But these systems are difficult and hazardous to use, are unstable and expensive.

SUMMARY OF THE INVENTION

An initiator system has now been found which minimizes these disadvantages. This system is composed of (1) a peroxy or peracid compound,
(2) benzoin, and
(3) a metal salt.

The initiator system can be used in the poylmerization, in an organic liquid, of ethylenically unsaturated monomers or mixtures of monomers. It works especially well in the preparation of acrylic polymers or copolymers such as poly(methyl methacrylate), poly(butyl acrylate), poly(acrylonitrile) and poly(methacrylonitrile). It also works well in the preparation of vinyl ester polymers or copolymers, polyvinyl chloride and polyvinylidene chloride. It works well in the preparation of vinyl ester polymers or copolymers, polyvinyl chloride and polyvinylidene chloride. It works especially well in the preparation of acrylic graft copolymers and block copolymers and in preparation of conjunctive polymers of the type described in U.S. application Ser. No. 867,688, filed Oct. 20, 1969, and now abandoned.

Utility of the product

The liquid product one obtains by using this initiator system can be used directly to prepare paints or other coating compositions, or to prepare adhesives.

If it is necessary that the polymer be isolated, this can be done quite easily by simply stripping off the organic liquid with heat, or under vacuum. In this way a bulk polymer or an unsupported film of the polymer can be prepared.

The peroxy or peracid compound

The peroxy or peracid compound used can be represented by the structure $$R-O-O-R_1$$

where

R can be an alkyl or aralkyl radical of 1–20 carbon atoms, or an aliphatic or aromatic acyl radical; and
$R_1$ can be hydrogen, an alkyl or aralkyl radical of 1–20 carbon atoms, or an aliphatic or aromatic acyl radical.

Combinations of the peroxy or peracid compounds can also be used. The preferred compounds are the hydroperoxides. Especially preferred are cumene hydroperoxide and t-butyl hydroperoxide.

Such compounds are generally used at a concentration of about 0.5% to about 1% by weight of the monomer charge. In some situations it may be desirable to use from 0.1% to about 0.5%, but the speed of the reaction is ordinarily reduced when this is done. Concentrations of from about 1% to 10% can also be used, but these larger amounts are usually unnecessary.

As explained, the initiator system can be used to prepare graft or block copolymers or conjunctive polymers. When this is done, the alkyl or acyl radicals of these peroxy or peracid compounds are part of the precursor polymer chain, either in the middle or at the ends, to give polymers with pendant —OOH or

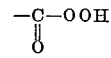

groups.

Such precursor polymers can be prepared by first copolymerizing an ethylenically unsaturated monomer such as acrylic acid, methacrylic acid, or one of their esters, nitriles or amides with from 0.15–10%, by weight of the monomer charge, preferably 1–2%, of a monomer represented by the structure

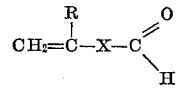

where

R can be hydrogen, alkyl of 1 through 18 carbon atoms, phenyl or phenyl substituted with alkyl of 1 through 4 carbon atoms;
X can be phenylene or $(CH_2)_n$; and
$n$ can be 0–10.

This polymerization is carried out in solution, at elevated temperature, ordinarily about 100° C., the usual amount of a free-radical polymerization initiator such as azobisisobutyronitrile. Suitable solvents are those which will dissolve both the monomers and the polymer product. One should avoid use of those solvents which chain transfer at rates equal to or greater than toluene. Illustrative of such solvents are ethyl benzene and xylene.

The resulting product is then oxidized by first adding from 0.01% through about 0.5%, by weight, of the solids, preferably 0.04%, of an active-hydrogen abstracting substance such as tertiary butyl peroxypivalate and then holding the solution within the range of 50° C. to about 200° C., under 1–8 atmospheres of dry air, with stirring, for from 10 minutes to 20 hours. Heating is then stopped and the mixture is purged with nitrogen for from 10 minutes to about 2 hours.

The metal salt

The metal salt used can be of a metal that can exist in more than one valence state. Illustrative of such metals are iron, tin, nickel, chromium, copper, cobalt, manganese and cerium. Iron, cerium or cobalt salts, especially in the lower valence state, are preferred. Of these three, iron salts are preferred, especially ferrous octoate.

The metal salt, or mixture of metal salts, is ordinarily used at a concentration of from about 100 to about 1000 parts per million of monomer charge. From about 20 to 50 parts per million can be used in certain cases, and concentrations of from 500 parts to about 10,000 parts per million can be used, but use of the lower concentration slows the rate of reaction, and use of the higher concentration appears to confer no particular advantage.

Benzoin

Benzoin is ordinarily used at concentrations of from 0.5% to 5%, preferably 1.5%, by weight, of final polymer solids.

The organic liquid

The organic liquid used in the process can be any of those ordinarily used in the preparation of polymers. Aliphatic or aromatic hydrocarbons, chlorinated hydrocarbons, ethers, amides, sulfoxides, ketones, esters, alcohols, or the like are satisfactory. In the preparation of graft copolymers an organic liquid with low chain transfer constants, e.g. benzene or ethyl acetate should be used. Mixtures of these can also be used. The choice depends on the liquids' solvency for the polymer being made.

How the initiator system is used

The system is used by placing a suitable organic liquid, the monomer charge and the initiator system in a reaction vessel under a nitrogen atmosphere. The amount of liquid and amount of monomer are chosen according to well known principles of polymer chemistry.

If a graft, block or conjunctive copolymer is being made, one ordinarily uses the reaction mass which results from preparation of the precursor polymer. To this are added suitable amounts of the metal salt, benzoin and grafting monomer.

In either case, the reaction mass is then allowed to stand at room temperature. After an induction period of about one-half hour, polymerization begins and continues until it is complete. The reaction itself announces its completion by no longer giving off heat.

EXAMPLES

Those skilled in the art will be able to practice the invention more easily after referring to the following examples. In these examples, all parts are by weight.

Example 1

To a reaction vessel are charged

| | Parts |
|---|---|
| Methyl methacrylate | 50 |
| Benzene | 150 |
| Tertiary butyl peroxide | 0.5 |
| Benzoin | 1.75 |
| 6% ferrous octoate solution in hydrocarbon solvent | 0.25 |

This mixture is stirred at room temperature under an atmosphere of nitrogen.

After a total reaction time of about 3 hours, 0.5 part of hydroquinone is added to the mixture to stop polymerization.

The resulting product is a solution of poly(methyl methacrylate).

Example 2

The procedure of Example 1 is repeated, substituting 50 parts of acrylonitrile for the methyl methacrylate and 200 parts of N-methyl pyrrolidone for the benzene.

The resulting product is a solution of poly(acrylonitrile).

Example 3

To a reaction vessel are charged

| | Parts |
|---|---|
| Methyl methacrylate | 2,245 |
| Acrolein | 17 |
| Azobisisobutyronitrile | 28.8 |
| Ethyl acetate | 1,434 |
| n.Butyl acetate | 326 |

This mixture is refluxed for four hours, with stirring. To it are then added 1,303 parts of ethyl acetate and 297 parts of n.butyl acetate.

To 2,800 parts of the resulting solution are added 0.22 parts of t.butyl perpivalate, 138.5 parts of ethyl acetate and 31.5 parts of n.butyl acetate. The vessel is charged with 4 atmospheres of dry air and the reaction mixture held for two hours for 85–90° C., with stirring. The vessel is then purged with nitrogen for 15 minutes and the reaction mixture cooled to room temperature.

To 900 parts of the resulting product are added

| | Parts |
|---|---|
| Butyl acrylate | 115 |
| Ethyl acetate | 123 |
| Iron octoate (6% solution in liquid hydrocarbon) | 0.81 |
| Benzoin | 6.67 |

This mixture is stirred under nitrogen for three hours and then held at room temperature until the exotherm stops.

The resulting product is a solution, 38.5% solids, containing methyl methacrylate/butyl acrylate/methyl methacrylate 37/26/37 conjunctive polymer.

What is claimed is:
1. A low temperature process for preparing a graft or block polymer of ethylenically unsaturated monomers, the process comprising
   (a) bringing together a suitable monomer(s), an organic liquid and a polymerization initiator system consisting essentially of
      (1) a precursor oxidized copolymer of an ethylenically unsaturated monomer(s) and 0.1%–50% of a monomer represented by the structure

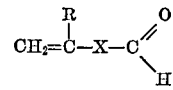

where
   R can be hydrogen, alkyl of 1–18 carbon atoms, phenyl or phenyl substituted with alkyl of 1–4 carbon atoms;
   X can be phenylene or $(CH_2)_n$ and
   $n$ can be 0–10,
      (2) benzoin, and
      (3) a salt of a metal which can exist in more than one valence state; and
   (b) keeping these together until the polymerization reaction stops.

2. The process of claim 1 wherein the metal salt in (3) is a ferrous salt.

3. The process of claim 2 wherein the ferrous salt is ferrous octoate.

References Cited

UNITED STATES PATENTS

| | | | |
|---|---|---|---|
| 2,911,398 | 11/1959 | Vandenberg | 260—89.5 A |
| 2,911,436 | 11/1959 | Miller et al. | 260—89.5 A |
| 3,065,212 | 11/1962 | Milford et al. | 260—85.5 F |
| 3,200,103 | 8/1965 | Chadha | 260—89.5 A |
| 3,539,544 | 11/1970 | Marbach | 260—85.5 R |

Roberts et al., Basic Principals of Organic Chemistry, W. A. Benjamin, Inc. (1965) pp. 496–8.

Shiro et al., J. Chem. Soc. Japan 72 September 1969, pp. 2076–81.

HARRY WONG, JR., Primary Examiner

U.S. Cl. X.R.

260—73 R, 73 L, 88.7 R, 89.5 A, 91.7, 92.8 R